(12) United States Patent
Hokenek et al.

(10) Patent No.: US 6,968,445 B2
(45) Date of Patent: Nov. 22, 2005

(54) MULTITHREADED PROCESSOR WITH EFFICIENT PROCESSING FOR CONVERGENCE DEVICE APPLICATIONS

(75) Inventors: Erdem Hokenek, Yorktown Heights, NY (US); Mayan Moudgill, White Plains, NY (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 463 days.

(21) Appl. No.: 10/269,372

(22) Filed: Oct. 11, 2002

(65) Prior Publication Data

US 2003/0120901 A1 Jun. 26, 2003

Related U.S. Application Data

(60) Provisional application No. 60/341,289, filed on Dec. 20, 2001.

(51) Int. Cl.[7] .......................... G06F 9/302; G06F 15/80
(52) U.S. Cl. ............................. 712/222; 712/2; 712/7; 712/221
(58) Field of Search ........................... 712/2, 3, 7, 221, 712/222

(56) References Cited

U.S. PATENT DOCUMENTS

| 5,649,135 | A |   | 7/1997 | Pechanek et al. |
| 5,659,785 | A |   | 8/1997 | Pechanek et al. |
| 5,682,491 | A |   | 10/1997 | Pechanek et al. |
| 5,909,572 | A | * | 6/1999 | Thayer et al. ............... 712/226 |
| 5,974,538 | A |   | 10/1999 | Wilmot, II |
| 6,079,010 | A |   | 6/2000 | D'Arcy et al. |
| 6,128,720 | A |   | 10/2000 | Pechanek et al. |
| 6,205,519 | B1 |   | 3/2001 | Aglietti et al. |
| 6,230,251 | B1 |   | 5/2001 | Batten et al. |
| 6,256,725 | B1 |   | 7/2001 | Batten et al. |
| 6,260,189 | B1 |   | 7/2001 | Batten et al. |
| 6,269,437 | B1 |   | 7/2001 | Batten et al. |
| 6,282,585 | B1 |   | 8/2001 | Batten et al. |
| 6,292,822 | B1 |   | 9/2001 | Hardwick |
| 6,298,438 | B1 |   | 10/2001 | Thayer et al. |
| 6,314,511 | B2 |   | 11/2001 | Levy et al. |
| 6,317,821 | B1 |   | 11/2001 | Batten et al. |
| 6,449,719 | B1 |   | 9/2002 | Baker |

OTHER PUBLICATIONS

C.J. Glossner, "The Delft-Java Engine," Doctoral Thesis, Delft University of Technology, Netherlands, Nov. 5, 2001.

(Continued)

Primary Examiner—William M. Treat
(74) Attorney, Agent, or Firm—Ryan, Mason & Lewis, LLP

(57) ABSTRACT

A multithreaded processor includes an instruction decoder for decoding retrieved instructions to determine an instruction type for each of the retrieved instructions, an integer unit coupled to the instruction decoder for processing integer type instructions, and a vector unit coupled to the instruction decoder for processing vector type instructions. A reduction unit is preferably associated with the vector unit and receives parallel data elements processed in the vector unit. The reduction unit generates a serial output from the parallel data elements. The processor may be configured to execute at least control code, digital signal processor (DSP) code, Java code and network processing code, and is therefore well-suited for use in a convergence device. The processor is preferably configured to utilize token triggered threading in conjunction with instruction pipelining.

19 Claims, 2 Drawing Sheets

OTHER PUBLICATIONS

"Basic Features of the HEP Supercomputer," http://www-ee.eng.hawaii.edu/~nava/HEP/introduction.html, pp. 1-2.

"The MOVE Concept," http://ce.et.tudelft.nl/MOVE/section3.2.html, pp. 1-2.

"Simultaneous Multithreading Project," http://www.cs.washington.edu/research/smt/index.html, pp. 1-7.

N. Yadav et al., "Parallel Saturating Fractional Arithmetic Units," Proceedings of the 9th Great Lakes Symposium on VLSI, pp. 172-179, Ann Arbor, Michigan, Mar. 4-6, 1999.

"Introduction to Multithreading, Superthreading and Hyperthreading," http://arstechnica.com/paedia/h/hyperthreading/hyperthreading-1.html, pp. 1-5.

* cited by examiner

MULTITHREADED PROCESSOR WITH EFFICIENT PROCESSING FOR CONVERGENCE DEVICE APPLICATIONS

RELATED APPLICATION(S)

The present application claims the priority of U.S. Provisional Application Ser. No. 60/341,289 filed Dec. 20, 2001 and entitled "Method and Apparatus for Multithreaded Processor," which is incorporated by reference herein.

The present invention is related to the inventions described in U.S. patent applications Ser. No. 10/269,247, entitled "Method and Apparatus for Thread-Based Memory Access in a Multithreaded Processor," Ser. No. 10/269,373, entitled "Method and Apparatus for Register File Port Reduction in a Multithreaded Processor," and Ser. No. 10/269,245, entitled "Method and Apparatus for Token Triggered Multithreading," all of which are filed concurrently herewith and incorporated by reference herein. Application Ser. Nos. 10/269,373 and 10/269,245 have since issued as U.S. Pat. Nos. 6,904,511 and 6,842,848, respectively.

FIELD OF THE INVENTION

The present invention relates generally to the field of digital data processors, and more particularly to multithreaded processors.

BACKGROUND OF THE INVENTION

Multithreaded processors are processors that support simultaneous execution of multiple distinct instruction sequences or "threads." Conventional threading techniques are described in, for example, M. J. Flynn, "Computer Architecture: Pipelined and Parallel Processor Design," Jones and Bartlett Publishers, Boston, Mass., 1995, and G. A. Blaauw and Frederick P. Brooks, "Computer Architecture: Concepts and Evolution," Addison-Wesley, Reading, Mass., 1997, both of which are incorporated by reference herein.

Existing multithreaded processors are generally not optimized for use in convergence devices, which may include devices configured for processing of voice, data, audio, video and other information communicated over a variety of different media. Such devices will typically require execution of a number of different types of code, including digital signal processor (DSP) code associated with signal processing operations as well high-level program application code written in Java or another object-oriented programming language. A more particular example of a convergence device of this type is a wireless mobile unit of a recently-developed high-speed CDMA communication system such as the 3rd Generation Partnership Project (3GPP) Wideband CDMA (WCDMA) system, described in 3GPP Technical Specifications TS 25.1xx, which are incorporated by reference herein.

A need therefore exists for an improved multithreaded processor that is particularly well-suited for use in a convergence device.

SUMMARY OF THE INVENTION

The present invention provides an improved multithreaded processor which in an illustrative embodiment is capable of efficiently executing RISC-based control code, DSP code, Java code and network processing code, and is thus particularly well-suited for use in a 3GPP WCDMA mobile unit or other convergence device.

In accordance with one aspect of the invention, a multithreaded processor includes an instruction decoder for decoding retrieved instructions to determine an instruction type for each of the retrieved instructions, an integer unit coupled to the instruction decoder for processing integer type instructions, and a vector unit coupled to the instruction decoder for processing vector type instructions. A reduction unit is preferably associated with the vector unit and receives parallel data elements processed in the vector unit. The reduction unit generates a serial output from the parallel data elements. The processor is preferably configured to utilize token triggered threading in conjunction with instruction pipelining.

DETAILED DESCRIPTION OF THE INVENTION

The present invention will be illustrated herein in conjunction with an exemplary multithreaded processor and corresponding processing system. It should be understood, however, that the invention does not require the use of the particular multithreaded processor and processing system configurations of the illustrative embodiments, and is more generally suitable for use in any multithreaded processor or information processing system application in which it is desirable to provide improved processor performance. In addition, although particularly well-suited for use in convergence devices, the multithreaded processor of the present invention can be used in other types of devices.

As will be described in greater detail below, an illustrative embodiment of a multithreaded processor in accordance with the present invention is capable of executing RISC-based control code, digital signal processor (DSP) code, Java code and network processing code. The processor includes a single instruction multiple data (SIMD) vector unit, a reduction unit, and long instruction word (LIW) compounded instruction execution.

Figure 1:
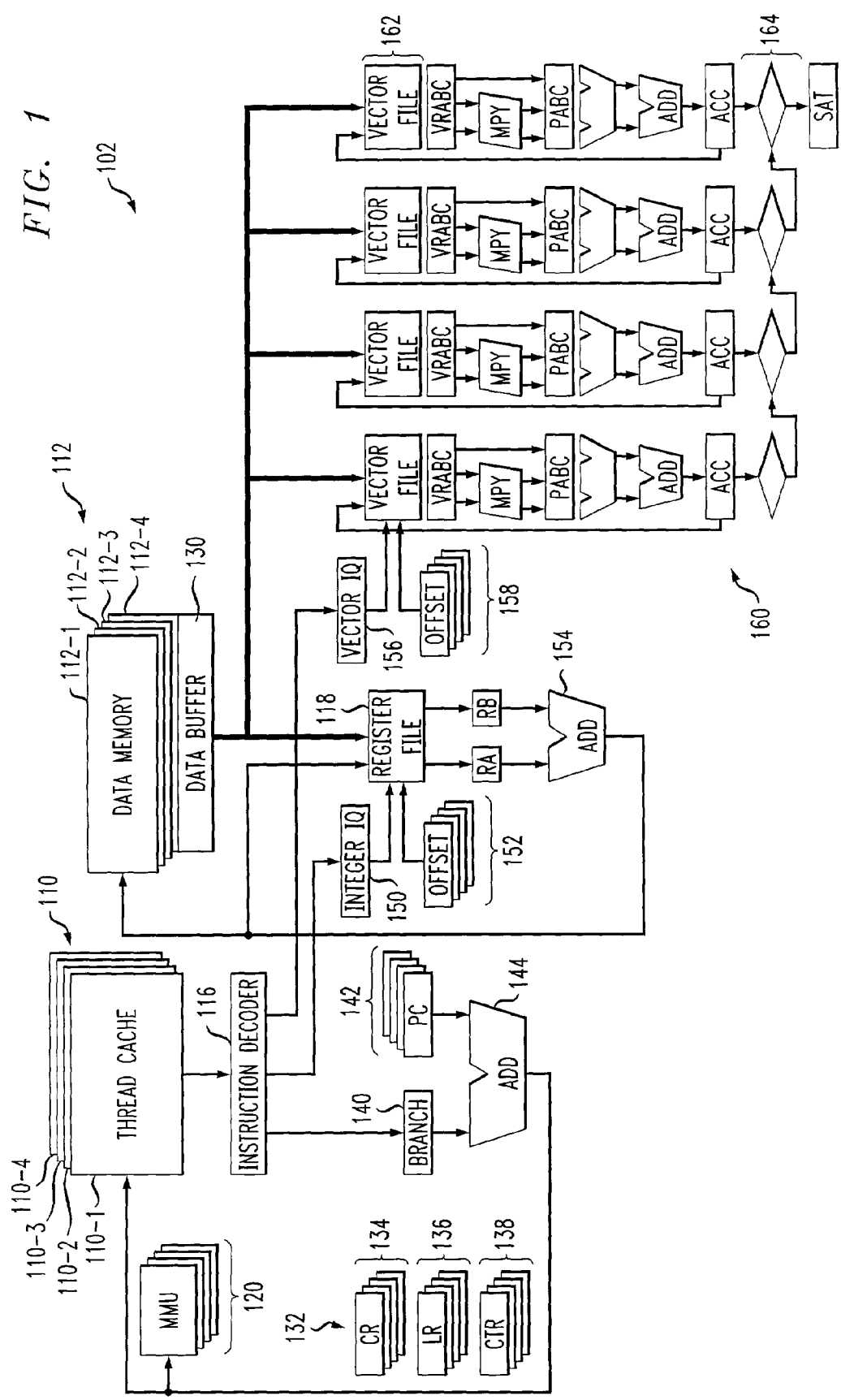
FIG. 1 is a block diagram of an illustrative embodiment of a multithreaded processor in accordance with the invention.

FIG. 1 shows a multithreaded processor 102 in accordance with the invention. The multithreaded processor 102 includes, among other elements, a multithreaded cache memory 110, a multithreaded data memory 112, an instruction decoder 116, a register file 118, and a memory management unit (MMU) 120. The multithreaded cache memory 110 is also referred to herein as a multithreaded cache.

The multithreaded cache 110 includes a plurality of thread caches 110-1, 110-2, ... 110-N, where N generally denotes the number of threads supported by the multithreaded processor 102, and in this particular example is given by N=4. Of course, other values of N may be used, as will be readily apparent to those skilled in the art.

Each thread thus has a corresponding thread cache associated therewith in the multithreaded cache 110. Similarly, the data memory 112 includes N distinct data memory instances, denoted data memories 112-1, 112-2, ... 112-N as shown.

The processor 102 may implement token triggered multithreading, such as that described in the above-cited U.S. patent application Ser. No. 10/269,245, entitled "Method and Apparatus for Token Triggered Multithreading." The token triggered threading typically assigns different tokens to each of a plurality of threads of the processor. For example, the token triggered threading may utilize a token to identify in association with a current processor clock cycle a particular one of the threads of the processor that will be permitted to issue an instruction for a subsequent clock cycle. Other types of threading may also or alternatively be used.

Each of the thread caches in the multithreaded cache 110 may comprise a memory array having one or more sets of memory locations. A given thread cache may further comprise a thread identifier register for storing an associated thread identifier.

The multithreaded cache 110 interfaces with a main memory (not shown) external to the processor 102 via the MMU 120. The MMU 120, like the cache 110, includes a separate instance for each of the N threads supported by the processor. The MMU 120 ensures that the appropriate instructions from main memory are loaded into the multithreaded cache 110. The MMU 120, which may comprise or otherwise have associated therewith a cache controller, may implement at least a portion of an address mapping technique, such as fully associative mapping, direct mapping or set-associative mapping. Illustrative set-associative mapping techniques suitable for use in conjunction with the present invention are described in U.S. patent application Ser. Nos. 10/161,774 and 10/161,874, both filed Jun. 4, 2002 and commonly assigned with the present application, and both of which are incorporated by reference herein.

The data memory 112 is also typically directly connected to the above-noted external main memory, although this connection is also not explicitly shown in the figure. Also associated with the data memory 112 is a data buffer 130.

Techniques for thread-based banking of the multithreaded cache 110, the data memory 112 or other memories associated with a multithreaded processor are described in the above-cited U.S. patent application Ser. No. 10/269,247, entitled "Method and Apparatus for Thread-Based Memory Access in a Multithreaded Processor."

In general, the multithreaded cache 110 is used to store instructions to be executed by the multithreaded processor 102, while the data memory 112 stores data that is operated on by the instructions. Instructions are fetched from the multithreaded cache 110 by the instruction decoder 116 and decoded. Depending upon the instruction type, the instruction decoder 116 may forward a given instruction or associated information to various other units within the processor, as will be described below.

The processor 102 further includes a set of auxiliary registers 132, which in this example comprise control registers (CRs) 134, link registers (LRs) 136, and counter registers (CTRs) 138. These auxiliary registers assist in program control flow by modifying the location of instructions that are fetched. As illustrated in the figure, there is one instance of each of the auxiliary registers 134, 136 and 138 associated with each of the threads in the illustrative embodiment.

Other registers within the processor 102 include branch register 140 and program counter (PC) registers 142. Like the auxiliary registers 134, 136 and 138, the program counter registers 142 include one instance for each of the threads. The branch register 140 receives instructions from the instruction decoder 116, and in conjunction with the program counter registers 142 provide input to an ADD block 144. Elements 140, 142 and 144 collectively comprise a branch unit of the processor 102. The branch unit controls the fetching of instructions in an instruction pipeline implemented by the processor.

The register file 118 provides temporary storage of integer results. Instructions forwarded from the instruction decoder 116 to an integer instruction queue (IQ) 150 are decoded and the proper hardware thread unit is selected through the use of an offset unit 152 which is shown as including a separate instance for each of the threads. The offset unit 152 inserts explicit bits into register file addresses so that independent thread data is not corrupted. For a given thread, these explicit bits may comprise, e.g., a corresponding thread identifier.

As shown in the figure, the register file 118 is coupled to input registers RA and RB, the outputs of which are coupled to an ADD block 154. The input registers RA and RB are used in implementing instruction pipelining. The output of the ADD block 154 is coupled to the data memory 112.

The register file 118, integer instruction queue 150, offset unit 152, elements RA and RB, and addition element 154 collectively comprise an exemplary integer unit in accordance with the invention.

Techniques for thread-based access to a register file such as register file 118 are described in the above-cited U.S. patent application Ser. No. 10/269,373, entitled "Method and Apparatus for Register File Port Reduction in a Multithreaded Processor."

Instruction types executable in the processor 102 include Branch, Load, Store, Integer and Vector/SIMD instruction types. If a given instruction does not specify a Branch, Load, Store or Integer operation, it is a Vector/SIMD instruction. Other instruction types can also or alternatively be used. These Integer and Vector/SIMD instruction types are examples of what are more generally referred to herein as integer and vector instruction types, respectively.

A vector IQ 156 receives vector/SIMD instructions forwarded from the instruction decoder 116. A corresponding offset unit 158, shown as including a separate instance for each of the threads, serves to insert the appropriate bits to ensure that independent thread data is not corrupted.

A vector unit 160 of the processor 102 is separated into N distinct parallel portions, and includes a vector file 162 which is similarly divided. The vector file 162 serves substantially the same purpose as the register file 118 except that the former operates on Vector/SIMD instruction types.

The vector unit 160 illustratively comprises the vector instruction queue 156, the offset unit 158, the vector file 162, and the arithmetic and storage elements associated therewith.

The operation of the vector unit 160 is as follows. A given Vector/SIMD data block encoded either as a fractional or integer data type is read from the vector file 162 and is stored into architecturally visible registers VRABC. From there, the flow proceeds through MPY blocks that perform parallel concurrent multiplication of the Vector/SIMD data. The results are placed in the architecturally visible registers PABC. The ADD units then can perform additional arithmetic operations and place the results in Accumulator (ACC) registers. From there, the data proceeds through a reduction unit 164 where the results are summed in parallel but produce serial semantics. The serial semantics provide an output which is substantially the same as that which would be produced if the four saturating values computed in parallel in vector unit 160 were instead computed serially.

Such an output is also referred to herein as a serial output. The resulting reduced sum is placed in a saturation register denoted SAT.

The reduction unit 164 and other portions of the vector unit 160 may be implemented using techniques similar to those described in N. Yadav, M. Schulte and J. Glossner, "Parallel Saturating Fractional Arithmetic Units," Proceedings of the 9th Great Lakes Symposium on VLSI, pp. 172–179, Ann Arbor, Mich., Mar. 4–6, 1999, which is incorporated by reference herein.

Although shown as part of vector unit 160 in the illustrative embodiment, reduction unit 164 may be implemented as a separate element.

The processor 102 preferably utilizes pipelined instruction processing. For example, the processor 102 may utilize an instruction pipeline in which each thread issues a single instruction per processor clock cycle. As another example, the instruction pipeline may be configured such that each thread issues multiple instructions per processor clock cycle. More specifically, with a sufficient number of threads and appropriate pipelining, each thread of the processor may issue both a load instruction and a vector multiply instruction in a given processor clock cycle without stalling any of the threads.

Advantageously, the processor 102 as shown in FIG. 1 is capable of efficiently executing a variety of different types of instruction code, including RISC-based control code, DSP code, Java code and network processing code. The processor 102 is therefore particularly well-suited for implementation in a convergence device such as a 3GPP WCDMA mobile unit.

Figure 2:
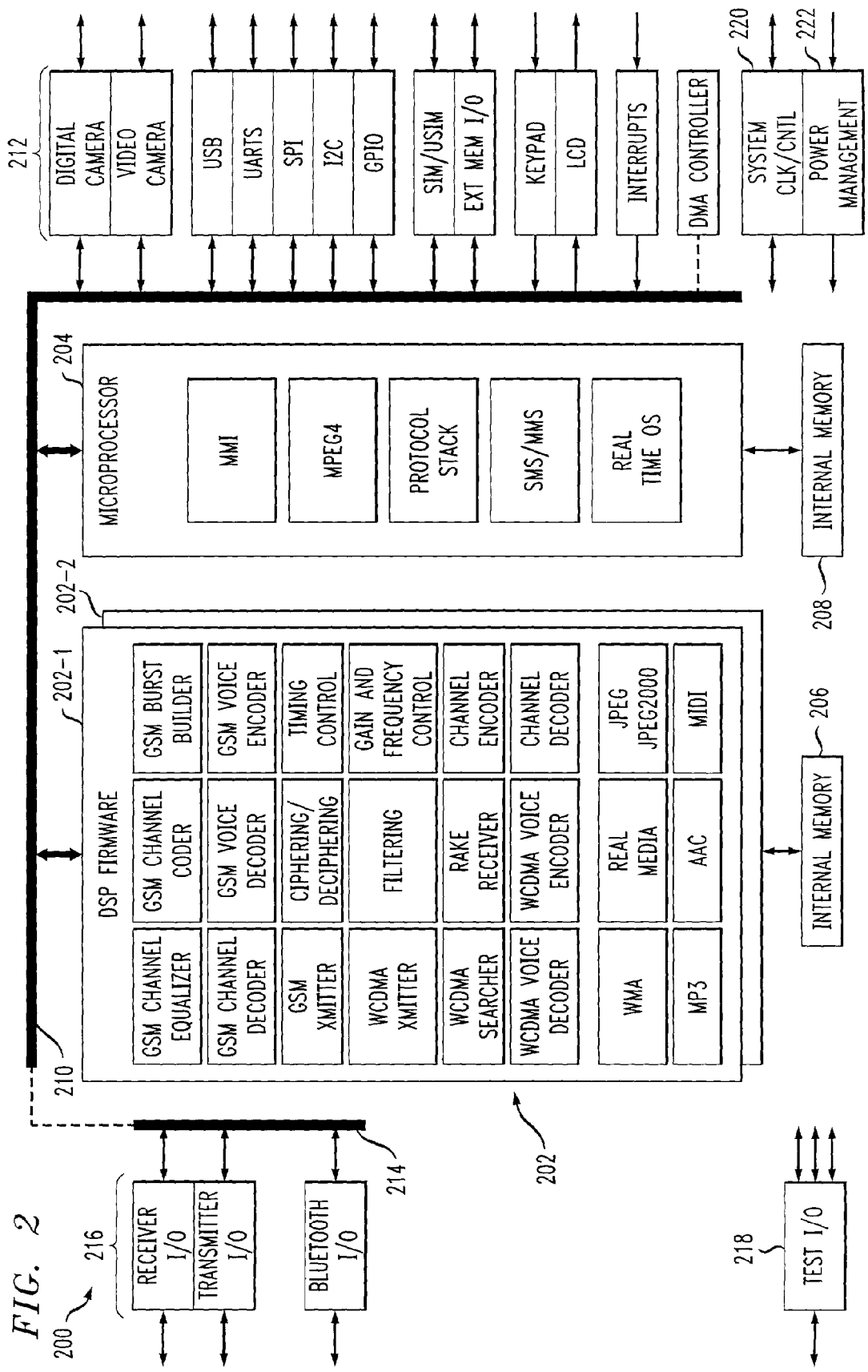
FIG. 2 is a block diagram illustrating one possible implementation of a processing system incorporating the multithreaded processor of FIG. 1.

FIG. 2 shows an example processing system 200 in which the processor 102 may be implemented. The processing system 200 may be viewed, for example, as an element of a convergence device such as the above-noted 3GPP WCDMA mobile unit.

More specifically, the processing system 200 in this embodiment is configured to support both WCDMA and Global System for Mobile Communication (GSM) wireless communication, as well as processing of voice, data, audio, video and other information communicated over a variety of different media.

The processing system 200 includes DSP firmware 202 and a microprocessor 204. The DSP firmware 202 is shown as comprising first and second instances denoted 202-1 and 202-2. The DSP firmware is coupled to an associated internal memory 206. The microprocessor 204 is coupled to an associated internal memory 208. The memories 206, 208 are referred to as "internal" in that they are internal to the processing system 200, and both may represent portions of a common memory. The DSP firmware 202 and microprocessor 204 may also each communicate with one or more external memories, which are not shown.

The DSP firmware 202 and microprocessor 204 are preferably both implemented using a single multithreaded processor configured as shown in FIG. 1. Other configurations, e.g., configurations based on multiple processors, can also be used.

The first instance 202-1 of the DSP firmware 202 illustratively includes a plurality of processing elements including a GSM channel equalizer, a GSM channel coder, a GSM burst builder, a GSM channel decoder, a GSM voice decoder, a GSM voice encoder, a GSM transmitter, ciphering/deciphering, timing control, a WCDMA transmitter, filtering, gain and frequency control, a WCDMA searcher, a Rake receiver, a channel encoder, a WCDMA voice decoder, a WCDMA voice encoder, and a channel decoder. Other elements include Windows® Media Audio (WMA), Real Media, Joint Photographic Experts Group (JPEG/JPEG2000), Moving Picture Experts Group Layer-3 Audio (MP3), Advanced Audio Coding (AAC) and Musical Instrument Digital Interface (MIDI). The operation of such elements is well understood in the art and therefore not described in further detail herein.

The second instance 202-2 of the DSP firmware 202 may be similarly configured, or may include other processing elements suitable for other supporting other communication functions in the processing system 200.

The microprocessor 204 illustratively comprises a number of processing elements, including man-machine interface (MMI), Moving Picture Experts Group 4 (MPEG4), protocol stack, Short Message Service/Messaging Management System (SMS/MMS), and real time operating system (OS) elements as shown. Again, the operation of such elements is well understood in the art.

The processing system 200 further includes communication bus 210 coupled between DSP firmware 202, microprocessor 204 and system elements 212. Similarly, communication bus 214 is coupled between DSP firmware 202 and system elements 216.

The system elements 212 include a digital camera, a video camera, Universal Serial Bus (USB), Universal Asynchronous Receiver/Transmitters (UARTS), SCSI Parallel Interface (SPI), Intelligent Interface Controller (I2C), General Purpose I/O (GPIO), Security Identity Module/Universal Subscriber Identity Module (SIM/USIM), external memory I/O, a keypad, an LCD, an interrupt controller, and a Direct Memory Access (DMA) controller.

The system elements 216 include receiver I/O, transmitter I/O, and Bluetooth I/O.

Other system elements shown in the figure include test input/output (I/O) 218, system clock and control 220, and power management 222.

The operation of the system elements 212, 216, 218, 220 and 222 is well understood in the art and such elements are therefore not further described herein.

As noted above, the functions associated with both DSP firmware 202 and microprocessor 204 may both be executed on a single multithreaded processor such as multithreaded processor 102. The multithreaded processor 102 may thus be utilized to execute code associated with the system elements 212, 216, 218, 220 and 222, as well as code associated with the processing elements of DSP firmware 202 and microprocessor 204.

The microprocessor 204 in the processing system 200 may be utilize to run code associated with high-level applications.

The processing elements associated with the DSP firmware 202 may be implemented utilizing software compilation. Advantageously, software compilation enables the efficient translation of high-level programming languages.

It should be emphasized that the present invention does not require the particular multithreaded processor and processing system configurations shown in FIGS. 1 and 2, respectively. As indicated previously, the invention can be implemented in a wide variety of other multithreaded processor and processing system configurations.

Moreover, it is to be appreciated that the particular arrangements shown in FIGS. 1 and 2 are simplified for clarity of illustration, and additional or alternative elements not explicitly shown may be included.

The above-described embodiments of the invention are thus intended to be illustrative only, and numerous alternative embodiments within the scope of the appended claims will be apparent to those skilled in the art.

What is claimed is:

1. A multithreaded processor comprising:
an instruction decoder for decoding retrieved instructions to determine an instruction type for each of at least a subset of the retrieved instructions;
an integer unit coupled to the instruction decoder for processing integer type instructions received from the instruction decoder;
a vector unit coupled to the instruction decoder for processing vector type instructions received from the instruction decoder; and
a reduction unit associated with the vector unit and receiving parallel data elements processed in the vector unit, the reduction unit generating a serial output from the parallel data elements.

2. The multithreaded processor of claim 1 wherein the instructions are retrieved by the instruction decoder from a multithreaded cache memory of the multithreaded processor, the multithreaded cache memory comprising a thread cache for each of a plurality of threads of the processor.

3. The multithreaded processor of claim 1 wherein the integer unit further comprises an integer instruction queue having an input coupled to an output of the instruction decoder, a register file having an input coupled to an output of the integer instruction queue, an offset unit having an output coupled to an input of the register file, and an addition element having at least one input coupled to an output of the register file.

4. The multithreaded processor of claim 3 wherein the offset unit comprises a separate instance for each of a plurality of threads supported by the processor.

5. The multithreaded processor of claim 1 wherein the vector unit further comprises a vector instruction queue having an input coupled to an output of the instruction decoder, a vector file having an input coupled to an output of the vector instruction queue, an offset unit having an output coupled to an input of the vector file, and at least one arithmetic element having an input coupled to an output of the vector file.

6. The multithreaded processor of claim 5 wherein the offset unit comprises a separate instance for each of a plurality of threads supported by the processor.

7. The multithreaded processor of claim 1 wherein the processor is configured to support at least branch, load, store, integer and vector instruction types.

8. The multithreaded processor of claim 7 wherein the vector instruction type comprises a single instruction multiple data instruction type.

9. The multithreaded processor of claim 1 wherein the vector unit comprises a plurality of parallel branches, with each of the branches corresponding to a particular thread of the processor.

10. The multithreaded processor of claim 9 wherein each of the parallel branches includes a series combination of a portion of a vector file, a multiplier, an adder and an accumulator.

11. The multithreaded processor of claim 1 wherein the processor is configured to execute at least control code, digital signal processor (DSP) code, Java code and network processing code.

12. The multithreaded processor of claim 1 wherein the processor is configured to utilize token triggered threading.

13. A multithreaded processor comprising:
an instruction decoder for decoding retrieved instructions to determine an instruction type for each of at least a subset of the retrieved instructions;
an integer unit coupled to the instruction decoder for processing integer type instructions received from the instruction decoder; and
a vector unit coupled to the instruction decoder for processing vector type instructions received from the instruction decoder;
wherein the processor is configured to utilize token triggered threading; and
wherein the token triggered threading utilizes a token to identify in association with a current processor clock cycle a particular one of a plurality of threads of the processor that will be permitted to issue an instruction for a subsequent clock cycle.

14. The multithreaded processor of claim 12 wherein the token triggered threading assigns different tokens to each of a plurality of threads of the processor.

15. The multithreaded processor of claim 1 wherein the processor is configured for pipelined instruction processing.

16. The multithreaded processor of claim 15 wherein the processor utilizes an instruction pipeline in which each thread issues a single instruction per processor clock cycle.

17. The multithreaded processor of claim 15 wherein the processor utilizes an instruction pipeline in which each thread issues multiple instructions per processor clock cycle.

18. The multithreaded processor of claim 17 wherein each of a plurality of threads of the processor issues both a load instruction and a vector multiply instruction in each of a corresponding plurality of processor clock cycles without stalling of any of the plurality of threads.

19. A processor system comprising:
a multithreaded processor; and
a memory associated with the multithreaded processor;
the multithreaded processor comprising an instruction decoder for decoding retrieved instructions to determine an instruction type for each of at least a subset of the retrieved instructions; an integer unit coupled to the instruction decoder for processing integer type instructions received from the instruction decoder; a vector unit coupled to the instruction decoder for processing vector type instructions received from the instruction decoder; and a reduction unit associated with the vector unit and receiving parallel data elements processed in the vector unit, the reduction unit generating a serial output from the parallel data elements.

* * * * *